United States Patent [19]

Nakagawa

[11] Patent Number: 5,682,480
[45] Date of Patent: Oct. 28, 1997

[54] PARALLEL COMPUTER SYSTEM FOR PERFORMING BARRIER SYNCHRONIZATION BY TRANSFERRING THE SYNCHRONIZATION PACKET THROUGH A PATH WHICH BYPASSES THE PACKET BUFFER IN RESPONSE TO AN INTERRUPT

[75] Inventor: Takayuki Nakagawa, Hadano, Japan

[73] Assignee: Hitachi, Ltd., Tokyo, Japan

[21] Appl. No.: 514,738

[22] Filed: Aug. 14, 1995

[30] Foreign Application Priority Data

Aug. 15, 1994 [JP] Japan .................................. 6-191475

[51] Int. Cl.$^6$ .................................................. G06F 13/00
[52] U.S. Cl. .................. 395/200.19; 395/200.13; 395/250; 395/858; 395/872; 364/284.1
[58] Field of Search ........................ 395/460, 550, 395/200.13, 250, 858, 872; 364/200, 284.1; 370/85.6

[56] References Cited

U.S. PATENT DOCUMENTS

| | | | |
|---|---|---|---|
| 4,635,194 | 1/1987 | Burger et al. | 364/200 |
| 4,779,193 | 10/1988 | Koga et al. | 364/200 |
| 4,851,993 | 7/1989 | Chen et al. | 364/200 |
| 5,027,315 | 6/1991 | Agrawal et al. | 364/900 |
| 5,084,837 | 1/1992 | Matsumoto et al. | 395/250 |
| 5,384,906 | 1/1995 | Horst | 395/550 |
| 5,444,705 | 8/1995 | Olnowich et al. | 370/85.6 |
| 5,454,093 | 9/1995 | Abdulhafiz et al. | 395/460 |

OTHER PUBLICATIONS

T. Hori, et al. "AP 1000 Architecture and Performance Analysis", CPSY 91-26, pp. 172-175.

Primary Examiner—Thomas C. Lee
Assistant Examiner—Duo Chen
Attorney, Agent, or Firm—Antonelli, Terry, Stout & Kraus, LLP

[57] ABSTRACT

In a network-connected multiprocessor computer system, good cost performance and multifunctional network control is realized. In a computer system in which a plurality of processors are connected through a network, an interrupting signal line is provided in additional transmission lines. A packet is used for inter-processor communication, and a barrier synchronization packet of a fixed length is used in barrier synchronization processing. Although a barrier synchronization packet is transferred from a sending control circuit through the same transmission line for an ordinary packet, an interrupting signal is also transferred through the interrupting signal line at the same time. On the other hand, a receiving control circuit is provided with a priority control circuit in which the highest priority is given to a barrier synchronization packet, so that in response to an interrupting signal on the interrupting signal line, a barrier synchronization packet is sent to a processor without being written in a register file provided for storing an ordinary packet.

13 Claims, 7 Drawing Sheets

PARALLEL COMPUTER SYSTEM FOR PERFORMING BARRIER SYNCHRONIZATION BY TRANSFERRING THE SYNCHRONIZATION PACKET THROUGH A PATH WHICH BYPASSES THE PACKET BUFFER IN RESPONSE TO AN INTERRUPT

BACKGROUND OF THE INVENTION

1. Field of the Invention

The present invention relates to a parallel computer system and particularly to a configuration of a multiprocessor computer system which is directed to increase the speed of program execution and in which the cost performance of inter-processor network is good.

2. Description of the Related Art

Hitherto, realization of a multifunctional network in a multiprocessor computer system is disclosed in "The Architecture and Performance Estimation of the High parallel computer AP 1000" (hereinafter referred to as "Literature 1"), The Institute of Electronics and Communication Engineers of Japan, Report of Technical Research, CPSY 91-26, Vol. 91, No. 130. This parallel computer system has such a configuration as shown in FIG. 5.

FIG. 5 is a view showing a system configuration according to conventional art provided with two protocols, that is, a barrier synchronization protocol and a general use SEND protocol. In the drawing, the configuration includes processors A, B, C and D, a network 106, a barrier synchronization network 107, an instruction control circuit 1, a memory control circuit 2, a memory 3, a network interface circuit 48, and a barrier synchronization control circuit 49.

In a multiprocessor computer system, a plurality of processors perform their respective shares of execution of the processing. The term "barrier synchronization" means in order to prevent a certain one of the processors from excessively advancing in processing, execution in the processor is stopped when its processing has reached a specific instruction to be executed and the processor is made to wait for the other processors to reach the same processing stage, and at the point in time when all of the plurality of processors have reached the same processing stage, all of the processors are actuated to restart the processing at the same time. Thus, the processing is synchronized among the plurality of processors.

In the technique of the Literature 1, description is made for realization of high speed network processing by providing a network of a plurality of systems respectively for various uses in a parallel computer system. The technique, however, regards only the high speed property of the network as being important and does not take account of the cost performance of a large-scale parallel computer system. As a result, although the network function has been greatly improved, a network of three systems equal in data transfer throughput to each other are provided with no consideration of the cost performance of the network so that the number of signal lines is increased to bring about enlargement in processor size. Consequently, the number of used cables as well as the number of cards having LSIs (large scale integrated circuits) mounted thereon are doubled so that the cost is doubled correspondingly.

Further, virtual channel control for improving the throughput of a network in the case of existence of a plurality of packets in mixture is disclosed in Dally, "Virtual-Channel Flow Control" (hereinafter referred to as "Literature 2"), IEEE, Transactions on Parallel and Distributed Systems, 1992 Vol. 3, No. 2.

In the technique of the Literature 2, there is a description of a plurality of buffers which are substantially the same scale and are connected to a physical network of one system to thereby constitute a plurality of networks, theoretically and effectively. The technique of the Literature 2 is intended to improve the system throughput by transferring a plurality of packets having substantially the same urgency and packet length successively one by one from that which can be processed. There is however no consideration of the urgency of barrier synchronization for synchronizing multiple of processors. Further, there is no consideration of the cost performance of the transfer control hardware when a packet is mixed, which is short in packet length and which is high in urgency, for example, in the case of barrier synchronization, or the like. There are therefore such problems that the time for barrier synchronization processing is prolonged due to the time of buffer switching and writing processing into a register file and that the processing becomes complicated, while there is an advantage that competition among multiple packets may be reduced with a relatively low cost.

SUMMARY OF THE INVENTION

It is therefore an object of the present invention to provide a technique capable of realizing multifunctional network control with good cost performance in a network-connection multiprocessor computer system.

The above and other objects and novel features of the present invention will become apparent from the description of this specification and accompanying drawings.

In a parallel computer system in which a plurality of processors are connected through a network, an interrupting signal line for realizing a virtual channel for changing the order of arrival of packets is provided additionally to a packet transmission line. This interrupting signal line transmits an interrupting signal indicating the fact that the head of a packet given highest priority exists on the transmission line. The use of the packet indicated by the interrupting signal is judged by using a plurality of bits of the head of this packet. For example, in the case of treating packets of four kinds of priorities, it is sufficient to provide at least one interrupting signal line in order to perform the judgment by use of such a plurality of bits. Accordingly, the cost performance can be attained by the reduction of the number of the transmission lines of the network by making the network control circuit multifunctional as well as by the reduction of the number of the cables for connecting the processor boards with each other in the system.

Further, with the priority of a barrier synchronization packet made highest, a priority control circuit immediately stops processing of an ordinary communication packet having a variable packet length of several thousands of bits by a period of time of fixed cycles corresponding to the packet length of the barrier synchronization packet so as to transfer the barrier synchronization packet while giving the highest priority to the barrier synchronization packet. Accordingly, since the time taken for the entire processing is determined by the processing time of the processor which is longest among all the processors, the speed of the barrier synchronization processing is made high so as to be several thousand times so that the time for processing a user's program including a barrier synchronization is reduced.

Further, by proving an exclusive priority path for passing a fixed length packet such as a barrier synchronization packet with the highest priority without writing the packet in a buffer, the transfer time is shortened and the circuit configuration is simplified.

DESCRIPTION OF THE PREFERRED EMBODIMENTS

In all of the drawings provided for explaining the embodiments of the present invention, parts having the same function are referenced correspondingly and repeated description about the same part will be omitted hereunder.

Figure 1:
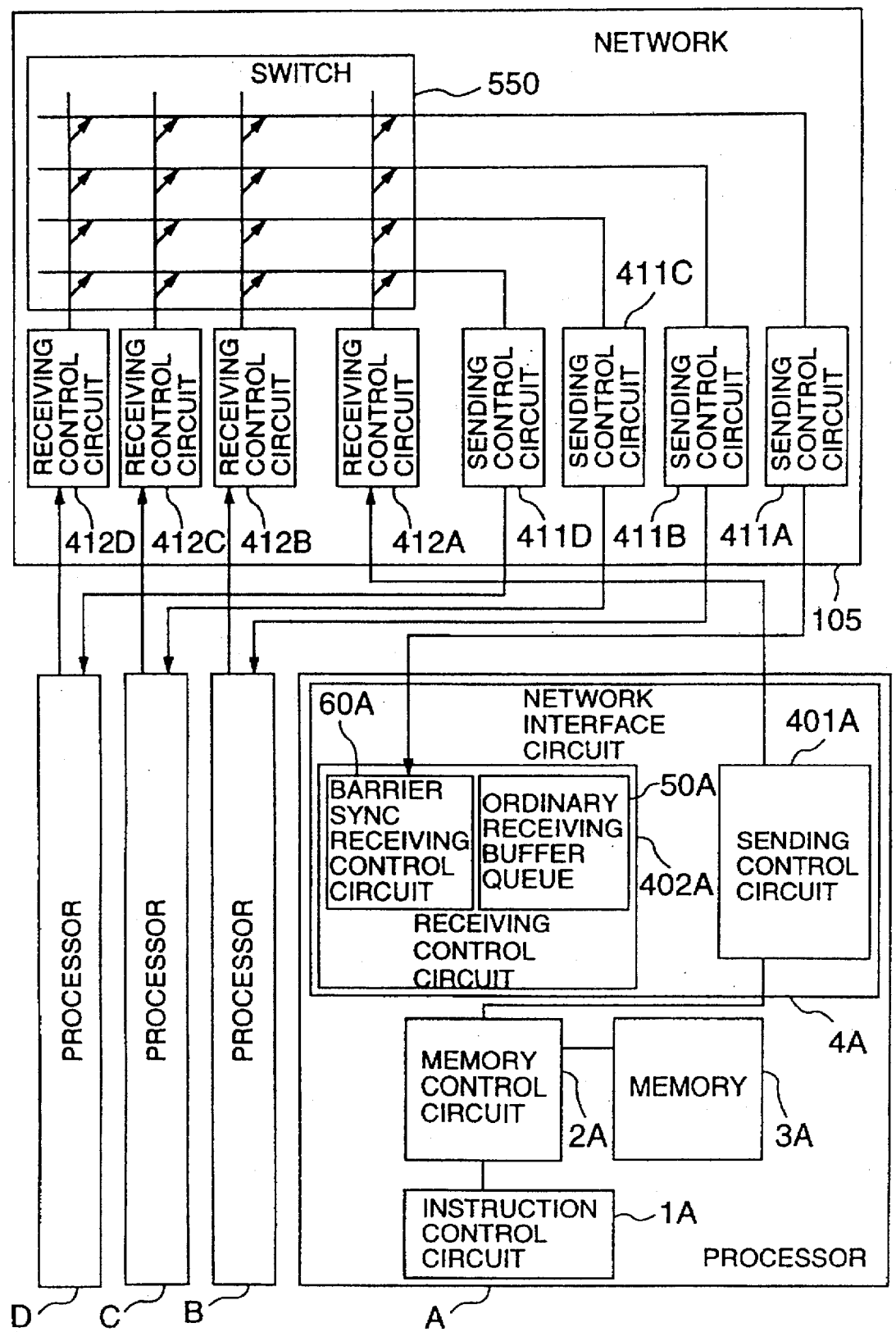
FIG. 1 is a block diagram showing the schematic configuration of an embodiment of a parallel computer system provided with a network, according to the present invention.

In the parallel computer system of this embodiment, as shown in FIG. 1, a plurality of processors A, B, C and D are connected through a network 105. The processors A, B, C and D share the same configuration with each other. In FIG. 1, while the inside configuration of only processor A is illustrated, the respective inside configurations of the other processors B, C and D are not illustrated.

In FIG. 1, the processors A, B, C and D respectively include instruction control circuits 1A, 1B, 1C and 1D; memory control circuits 2A, 2B, 2C and 2D; memories 3A, 3B, 3C and 3D; and network interface circuits 4A, 4B, 4C and 4D.

Further in FIG. 1, the network interface circuit 4A in the processor A has a sending control circuit 401A and a receiving control circuit 402A. Similarly to this, the network interface circuit 4B in the processor B has a sending control circuit 401B and a receiving control circuit 402B, the network interface circuit 4C in the processor C has a sending control circuit 401C and a receiving control circuit 402C, and the network interface circuit 4D in the processor D has a sending control circuit 401D and a receiving control circuit 402D. Since each of the processors B, C and D has the same configuration as the processor A, the sending control circuits 401B, 401C and 401D and the receiving control circuits 402B, 402C and 402D are not illustrated in FIG. 1.

The network 105 has a sending control circuit 411A corresponding to the receiving control circuit 402A in the processor A, and has a receiving control circuit 412A correspondingly to the sending control circuit 401A in the processor A. The receiving control circuit 402A has the same structure as the receiving control circuit 412A, and the sending control circuit 401A has the same structure as the sending control circuit 411A.

The data transmitted from the sending control circuit 401A of the processor A is received by the receiving control circuit 412A in the network 105. Conversely, the data transmitted from the sending control circuit 411A in the network 105 is received by the receiving control circuit 402A in the processor A.

Similar to the sending control circuit 401A and receiving control circuit 402A, receiving control circuits 412B, 412C and 412D and sending control circuits 411B, 411C and 411D are provided in the network 105 correspondingly to the sending control circuits 401B, 401C and 401D and the receiving control circuits 402B, 402C and 402D in the processors B, C and D, respectively. Further, the respective configurations of the receiving control circuit 412B (412C, 412D) and the sending control circuit 411B (411C, 411D) are the same as those of the receiving control circuit 402A and sending control circuit 401A respectively.

Here, the sending control circuits 411A, 411B, 411C and 411D in the network 105 transmit data to any of the receiving control circuits 412A, 412B, 412C and 412D in the network 105 through a switch 550.

Further, the receiving control circuit 402A is provided with an ordinary receiving buffer queue 50A and a barrier synchronization receiving control circuit 60A. Though not shown in the drawing, similar to the receiving control circuit 402A, each of the receiving control circuits 402B, 402C, 402D, 412A, 412B, 412C and 412D is provided with an ordinary receiving buffer queue and a barrier synchronization receiving control circuit.

Figure 2A:
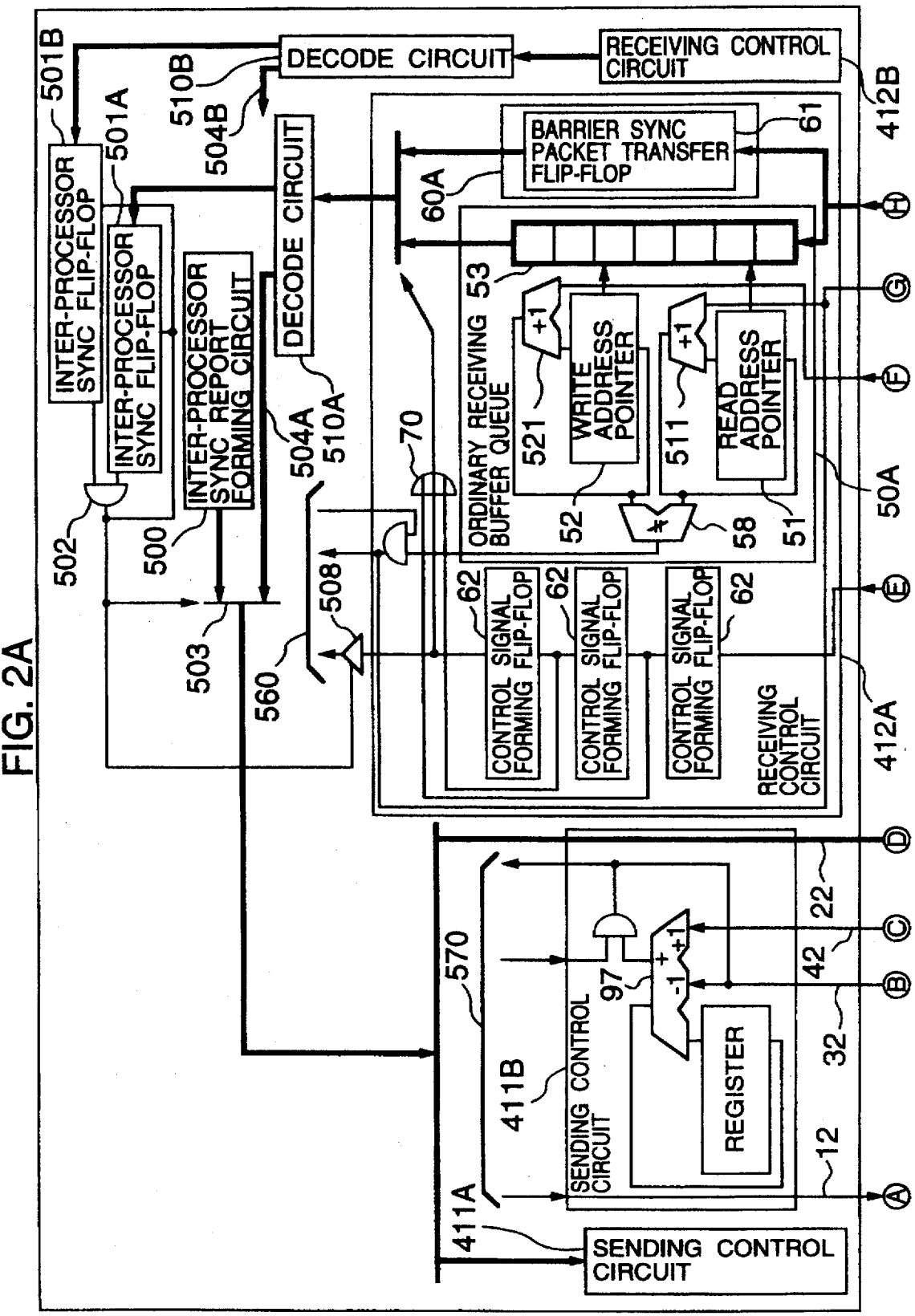
FIGS. 2A and 2 block diagrams showing the schematic configuration of an embodiment of a network control circuit which handles barrier synchronization and ordinary protocol according to the embodiment of the present invention.
Figure 2B:
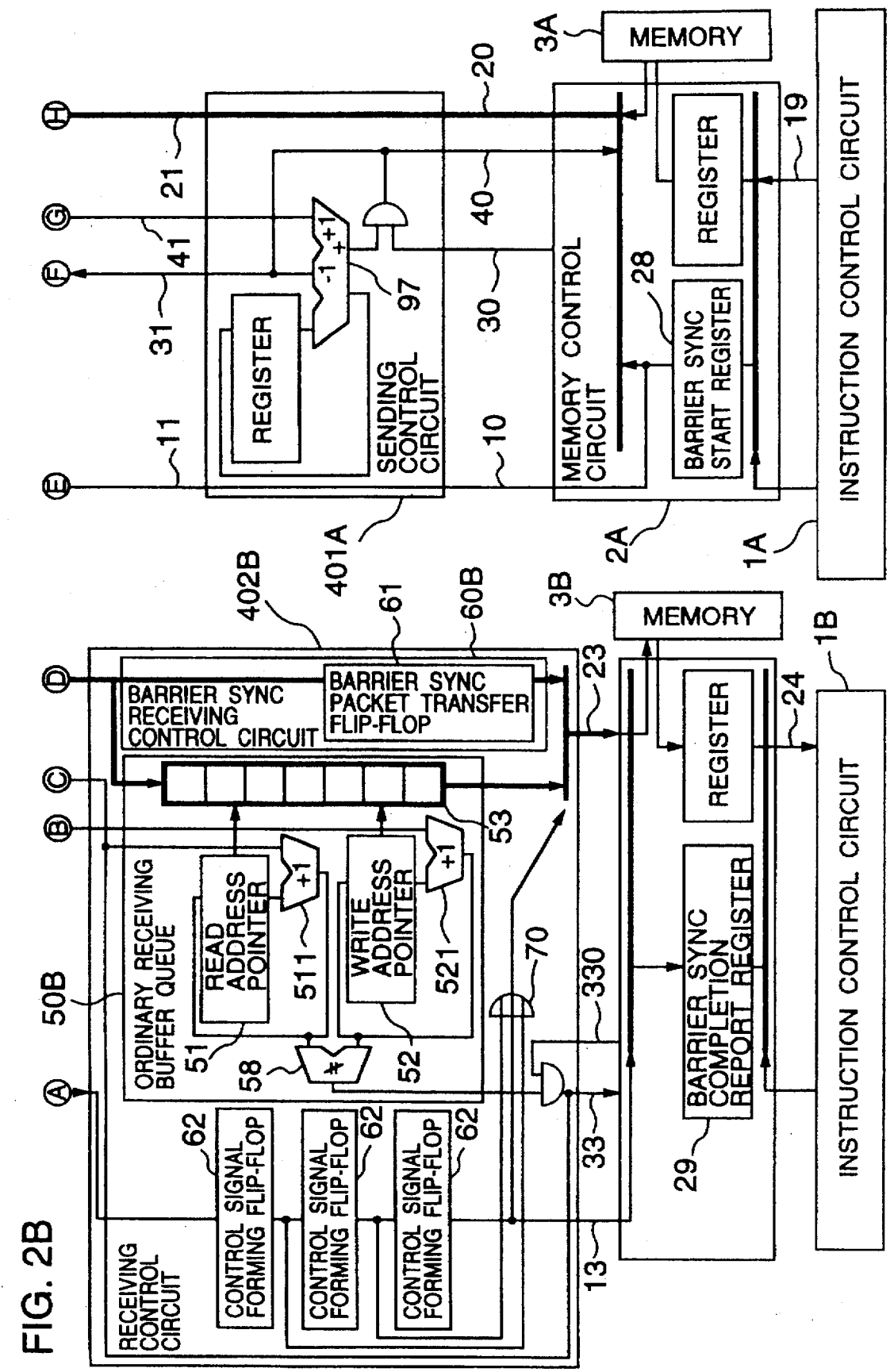

In FIGS. 1, 2A and 2B, the reference numerals 10–13 designate buffer ID switching signal line (interrupting signal line). Switching control between the ordinary receiving buffer queue 50B and the barrier synchronization receiving control circuit 60B is effected in the receiving control circuit 402B by the buffer ID switching signal (the interrupting signal) on the buffer ID switching signal line. In the sending control circuit 401A, data is transmitted by therethrough.

Further, in the network 105, data is transmitted from the receiving control circuit 412A to the sending control circuit 411B through the switch 550 (in FIGS. 2A and 2B, the switch 550 is illustrated in a simplified state). When barrier synchronization control is required, the instruction control circuit 1A controls the buffer ID switching signal to effect switching from the ordinary receiving buffer queue 50A to the barrier synchronization receiving control circuit 60A to thereby stop the ordinary data transmission so that the barrier synchronization packet is passed as a packet having highest priority through the barrier synchronization receiving control circuit. Thus, it is possible to transmit the barrier synchronization packet while overtaking the ordinary data.

Since this operation is carried out in all the receiving control circuits existing on the transmission path from the transmission side to the reception side, the transmission of the ordinary data is interrupted once so that the barrier synchronization packet can be transferred. After transfer of the barrier synchronization packet, the buffer switching signal is returned to its former state so that the transmission of the ordinary data is restarted.

The reference numeral 19 designates the memory store control signal line, 20–23 designate the data and buffer ID signal lines, and 24 designates the register load signal line. The reference numeral 28 designates a barrier synchronization start register, and 29 designates a barrier synchronization completion report register.

The reference numerals 30–33 designate data send-out signal lines, 40–42 designate buffer entry release signal lines (release signal line), 51 designates a read address pointer, 52 designates a write address pointer, 53 designates a receiving buffer, and 58 designates a read control comparator.

Further, the reference numeral 61 designates a barrier synchronization packet transfer flip-flop, 62 designates a control signal forming flip-flop, 70 designates a priority control circuit (OR gate), and 97 designates a receiving-buffer empty-entry number up/down counter.

Further, the reference numeral 500 designates an inter-processor synchronization report forming circuit, 501A and 501B designate inter-processor synchronization flip-flops, 502 designates an inter-processor synchronizing AND circuit, 511 designates a read address adder, and 521 designates a write address adder.

The embodiment will be described with respect to a system in which a physical network is provided with two protocols, that is, a barrier synchronization protocol and a general-use SEND protocol. However, in a case where, for example, a remote memory access protocol having intermediate priority between the above two protocols is added to the above two protocols and it is made possible to read/write a memory of another processor in the system by means of a fixed length packet, a higher effect of reducing the number of signals can be obtained.

In this embodiment, as shown in FIGS. 2A and 2B, a message packet transmitted from the sending control circuit 401A of the processor A is transferred to the receiving control circuit 412A of the network 105, switched to the sending control circuit 411B of a network selected in accordance with the sending-target processor number stated in the packet, and received by the receiving control circuit 402B of the second processor. The message packet received by the processor is written into an address in a receiving area on the processor memory by the same procedure as in the conventional art.

In the sending control circuit 401A, there is provided an up/down counter 97 for counting the number of receiving buffer empty entries on the sending target.

A signal which is made "1" when the head of a barrier synchronization packet is output onto the signal line 10 from the barrier synchronization start register 28 is output. The receiving buffer empty entry-number up/down counter 97 receives, on the signal line 31, a send signal (data sending signal) which becomes "1" every time data is sent onto the read data signal line 20 for reading data from the memory 3A. Responding to this send signal, the receiving buffer empty entry-number up/down counter 97 decrements (−1) the value of a register 98. On the other hand, the receiving buffer empty entry-number up/down counter 97 increments (+1) the value of the register 98 when the one entry is sent out from the receiving buffer of the sending-target and the receiving buffer empty entry-number up/down counter 97 receives, through the signal line 41, a release signal (buffer entry release signal) which is sent back every time the buffer becomes empty.

The receiving control circuits 402B and 412A are provided with the receiving buffer queues 50B and 50A for temporarily storing ordinary message packet data, and the barrier synchronization receiving control circuits 60B and 60A, respectively. Each of the receiving control circuits 402B and 412A is provided with a priority control circuit constituted by the control signal forming flip-flops 62 for forming a selector control signal for preferentially transferring a barrier synchronization packet which occupies the data line for three cycles in this embodiment, and the priority control circuit (OR gate) 70.

Each of the receiving buffer queues 50B and 50A is provided with the receiving buffer 53, the write address pointer 52, the write address adder 521 for renewing the pointer, the read address pointer 51, the read address adder 511 for renewing the read address pointer 51, and the comparator 58 for comparing the respective values of the read address pointer 51 and write address pointer 52 with each other to thereby generate a signal on the read control signal line (data sending signal line) in case the buffer is not-empty.

Each of the barrier synchronization receiving control circuits 60B and 60A is provided with a flip-flop 61 for transferring barrier synchronization packet data.

The data and a buffer ID signal from the receiving control circuit 412A are given to a decode circuit 510A. The decode circuit 510A decodes the bits at the head of a packet transferred thereto to thereby judge the use of the packet. That is, the decode circuit 510A judges whether the packet transferred thereto is a barrier synchronization packet or not, and if it is a barrier synchronization packet, the decode circuit 510A transfers the barrier synchronization packet to the inter-processor synchronization flip-flop 501A, while if it is not a barrier synchronization packet, the decode circuit 510A transfers the packet to a multiplexor 503 through a signal line 504A. That which is the same as the decode circuit 510A is provided in each of other sending control circuits (a decode circuit 510B is connected to the receiving control circuit 412B).

A signal line 560 from the receiving control circuit 412A is connected to a signal line 570 through a not-shown circuit.

The instruction control circuit 1A sets the barrier synchronization start register 28 to a value "1" to start the barrier synchronization processing when the processing has reached a specific stage, and transfers a barrier synchronization packet through the signal line 20. This packet is called a "synchronization report packet". The synchronization report packet is accumulated in the inter-processor synchronization flip-flop 501A through the sending control circuit 401A and the signal line 21, and through the receiving control circuit 412A in the network 105.

The synchronization report packet is repeatedly transferred together with a buffer ID switching signal (the value of the register 28) at a specific frequency from the instruction control circuit. This is repeated until synchronization is established so that the instruction control circuit receives a synchronization establishment packet which will be described later. A buffer ID switching signal is transferred together with a synchronization report package through the signal lines 10 and 11.

Similar to the instruction control circuit 1A, another instruction control circuit starts barrier synchronization processing when its processing has advanced to a specific stage. For example, also in the instruction control circuit 1B, when its processing has advanced to a specific stage, a synchronization report packet is accumulated into the inter-processor synchronization flip-flop 501B through the receiving control circuit 412B. With respect to another instruction control circuit, similarly, there is provided an inter-processor synchronization flip-flop (not shown). When reports from all the processors have been accumulated, a new barrier synchronization packet is generated by the inter-processor synchronization report forming circuit 500 and the accumulated information is cleared. This new barrier synchronization packet is called a synchronization establishment packet. The multiplexor 503 transfers a synchronization establishment packet in place of an ordinary packet from any other sending control circuit onto the signal lines 504A and 504B when the AND condition of the AND circuit 502 is established. A barrier synchronization packet has a length of three cycles, as will be described later, in which the data in the head cycle indicates the use of the packet and the data in the two remaining cycles includes discriminating information as to whether the packet is a synchronization report packet or a synchronization establishment packet.

The synchronization establishment packet is broadcast to all the processors which have started barrier synchronization processing. For example, in the receiving control circuit 402 of the processor B, a synchronization report packet is delivered to a memory control portion while an ordinary packet is bypassed and the establishment of synchronization is reported to the processors under the condition that the value of the barrier synchronization completion report register 29 has been renewed. With respect to the other processors, similarly, the establishment of synchronization is reported.

To the wiring for connecting the sending control circuit 401A and receiving control circuit 401A and the wiring for connecting the sending control circuit 401B and receiving control circuit 402B, buffer ID switching signal lines 10–13, data and buffer ID signal lines 20–23 are added. That is, the signal lines 10–13 for indicating alternation of the packet priority is provided in addition to the conventionally used signal lines forming a data transfer path.

Next, the operation of the network control circuit of this embodiment will be described below.

Now, in FIGS. 2A and 2B, assume that data is transmitted from the instruction control circuit 1A side to the instruction control circuit 1B side.

(1) The memory control circuit 2A on the sending side starts to transmit an ordinary message packet previously stored in the designated address on the memory 3A designated in response to a signal on the register store control signal line 19 from the instruction control circuit 1A. The sending control circuit 401A is allowed to transmit the data when the value of the receiving buffer empty entry-number up/down counter 97 of the buffer on the transmission-target is "+" and the transmission data is sent from the memory. The message packet data is delivered from the signal line 20 to the signal line 21 and the value of the receiving buffer empty entry-number up/down counter 97 is decremented.

(2) The receiving control circuit 412A in the network 105 sends data through the signal line 21 to the receiving buffer 53 so as to write the data in the address "0" and so as to increment the write pointer to make the value thereof be "1" through the send signal line (data sending signal) 31. Then the receiving control circuit 412A performs receiving processing through the signal line 31 and the data signal line 21. As soon as the sending control circuit 411B on the stage following the receiving control circuit 412A becomes empty, the receiving control circuit 412A sends the data read out from the address "0" of the receiving buffer to the sending control circuit 411B and increments the value of the read address pointer 51, and, at the same time, sends back a buffer entry release signal 41 to the transmission-origin (sending control circuit 411A).

(3) Upon reception of data from the receiving control circuit 412A, the sending control circuit 411B performs data transfer in accordance with the same procedure as that described in the above item (1). Similarly to this, the sending/receiving data from a circuit is transferred to another circuit in the next stage to thereby perform transfer of the message from the network 105.

(4) Upon reception of the data from the network 105, the receiving control circuit 402B on the receiving side performs data transfer in the same procedure as that described in the above item (2).

(5) The instruction control circuit 1B detects completion of message transfer to the memory 3B by a signal on the register load control signal line 24.

Transmission of a barrier synchronization packet in the period of data transmission described in the above items (1)–(5) will be now considered. When a barrier synchronization packet is transferred, newly provided buffer ID switching signal lines 10–13 are used. In the processor A, when barrier synchronization is started in the midway of transfer of ordinary data from the memory control circuit 2A, the transfer of the ordinary data is interrupted, while the buffer ID switching signal is set into the register 28 and transferred through the signal line 10, and data for barrier synchronization (synchronization report packet) is transmitted from the data line.

In the period in which the buffer ID switching signal is being set in this buffer ID switching signal line 10, ordinary data is not transferred and data sent onto the data line is regarded as barrier synchronization data (packet). Since the data line is constituted by a plurality of bit widths, if a value sent from the data line is made to have a meaning, for example, it is possible to change the order of priority of barrier synchronization or to give the data to a meaning other than barrier synchronization.

In the receiving control circuit 412A, a signal 71 is formed by the three inside flip-flops 62 and the circuit 70 on the basis of the buffer ID switching signal to control the selector so as to make it possible to preferentially transfer a synchronization report packet on the data line for three cycles.

By the selector control signal 71, the transmission of ordinary data from the receiving buffer 53 is interrupted for the three cycles, while, in place of the ordinary data, a synchronization report packet from the barrier synchronization receiving control circuit 60B is output. The decode circuit 510A judges whether the packet transmitted is a barrier synchronization packet or not, and transfers the packet to the inter-processor synchronization flip-flop 501A when the packet transmitted is a barrier synchronization packet.

On the other hand, when the reports from all of the processors have been accumulated, the AND condition is established in the AND gate 502, a new barrier synchronization packet is generated in the synchronization report forming circuit 500, and the accumulated information is cleared. A synchronization establishment packet is broadcast to all of the processors which have started the barrier synchronization processing. It is to be noted that at this time, a buffer ID switching signal has been transferred together with a synchronization establishment packet from each of the processors which are performing the barrier synchronization processing to the respective processors. Normally, any buffer ID switching signal is prevented from being transferred to the sending control circuit 411B by the function of the gate 508.

The sending control circuit 411B transfers a synchronization establishment packet through a by path to the receiving control circuit 402B. At this time, the buffer ID switching signal also passes the AND gate and is transferred together with the synchronization establishment packet to the processor by which the synchronization establishment packet is to be received.

In the receiving control circuit 402B, the buffer ID switching signal is received through the signal line 12 and a signal 71 is formed by the three flip-flops 62 inside the receiving control circuit 402B and the circuit 70 to thereby control the selector so as to make it possible to preferentially transfer a synchronization report packet on the data line for three cycles.

By the selector control signal 71, the transmission of ordinary data from the receiving buffer 53 is interrupted for the three cycles, while, in place of the ordinary data, a synchronization establishment packet is transmitted from the barrier synchronization receiving control circuit 60B.

Figure 3:
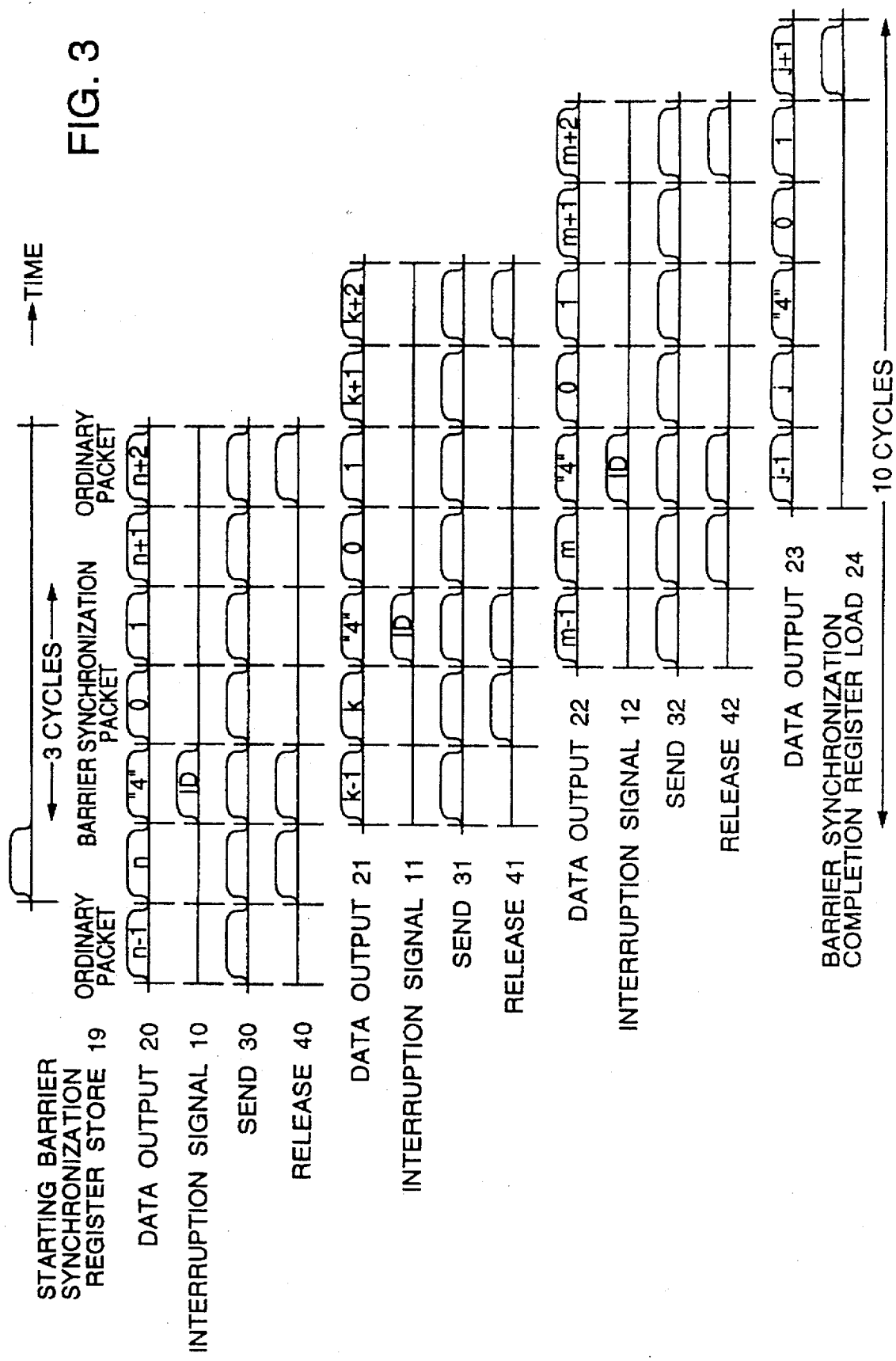
FIG. 3 is a time chart of barrier synchronization packet transfer during ordinary packet transfer according to the embodiment of the present invention.

FIG. 3 is a time chart of barrier synchronization packet transfer during ordinary packet transfer according to the embodiment. FIG. 3 particularly shows the case where the processor A among the plurality of processors has started barrier synchronization processing last and has transferred a synchronization report packet. Assume that the instruction control circuit 1A has transferred a barrier synchronization packet (synchronization report packet) of three cycles after transfer of the n-th data of the ordinary packet. Then, this synchronization report packet is accumulated in the synchronization start flip-flop 501A through the sending control circuit 401A and the receiving control circuit 412A. Since it is assumed now that other processors have started the barrier synchronization processing, synchronization report packets have been accumulated in the respective synchronization start flip-flops corresponding to the other processors. Consequently, the AND condition of the AND gate 502 is established so that the inter-processor synchronization flip-flop is reset and a synchronization report packet is generated from the synchronization report forming circuit 500.

The synchronization report is issued to the sending control circuits 411A and 411B in the network. For example, the packet which is being processed in the sending control circuit 411B in the network is interrupted at its k-th element, while interrupted at its j-th element in the receiving control circuit 402B in the processor (j≦k). Thus, a barrier synchronization packet (synchronization report packet, synchronization establishment packet) is processed with higher priority than any other ordinary packet so that it is possible to perform the barrier synchronization processing in a short time. If two cycles are required in each of the receiving and sending control circuits, the barrier synchronization processing can be completed in 10 cycles.

The data line between the sending control circuit 401A and the receiving control circuit 412A is constituted by about 9 bits and 64 Kcycles are therefore required for data transfer of 64 Kbites. By passing two such packets, 100 Kcycles or more can be saved, and the fact that the processing can be completed in 10 cycles means the processing speed is made high 10,000 times.

According to the configuration of the embodiment, an output of the memory control circuit 2A in the processor A, for example, the receiving packet processing in DMA transferring, is interrupted at its n-th element and the value of the interrupting signal line 10 is set to "1". In this example, if a value "4" is sent to the packet head data 20, a barrier synchronization packet of three cycles can be sent immediately.

This passing control is also repeated in an output portion of the sending control circuit 401A of the processor and the same packet is interrupted at its m-th (m≦n) element. The interrupting processing can be carried out by means that has been conventionally and generally used as path competition arbitration in such a manner that if a signal line 330 in the receiving control circuit 402B is actuated, the SEND signal line 33 is inhibited.

The synchronization report packet from the receiving control circuit 412A is transferred to the synchronization start flip-flop 501A. When the condition of the AND gate 502 is established, the inter-processor synchronization flip-flops 501A and 501B are reset and a synchronization establishment packet is generated from the synchronization report forming circuit 500.

The synchronization establishment is reported to the sending control circuits 411A and 411B in the network. For example, the packet which is being processed in the sending control circuit 411B in the network is interrupted at its k-th element, while interrupted at its j-th element in the receiving control circuit 402B in the processor (j≦k).

As described above, in this embodiment, it is possible to realize barrier synchronization network by additionally providing only one signal line without doubling the number of cables and the number of network substrates like such a conventional art as described in the above Literature 1.

Further, in this embodiment, like the technique described in the above Literature 2, the time taken for barrier synchronization processing could be shortened to one several-thousandths by changing packet arrival so that a barrier synchronization packet was not required to wait for completion of transfer of an ordinary packet.

Further, in this embodiment, a barrier synchronization packet was made to have a fixed length so as to be written in a flip-flop and was made to bypass storage means such as a register file, or the like, which was low in processing speed while it was highly integrated. Accordingly, the transfer time of the network could be further shortened and therefore a large-scale buffer became unnecessary.

Although the present invention was described above specifically based on the above embodiment, the present invention is not limited to the above embodiment, and it is a matter of course that changes and variations may be made without departing from the gist of the present invention.

Although a synchronization establishment packet is newly generated only when synchronization report packets have been gathered in the synchronization flip-flops from all the processors, the configuration may be changed such that when inter-processor communication is made with a preferential packet given a high priority other than a barrier synchronization packet, a processor may transfer such a preferential packet (hereinafter referred to as "general preferential packet") as it is to another processor.

Figure 4A:
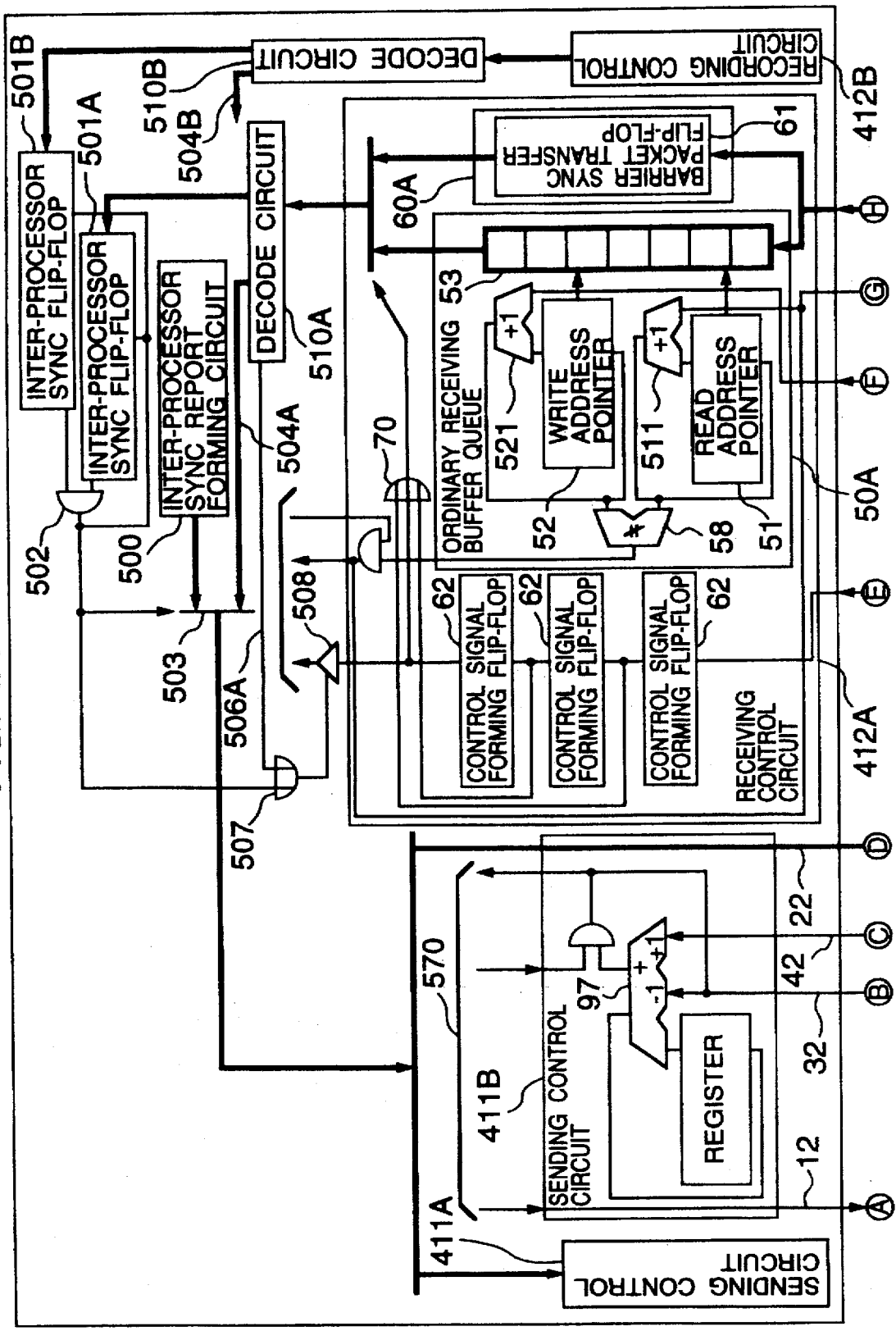
FIGS. 4A and 4 block diagrams showing the schematic configuration of an embodiment of a network control circuit which handles a priority packet in addition to a barrier synchronization packet and an ordinary packet according to the other embodiment of the present invention.
Figure 4B:
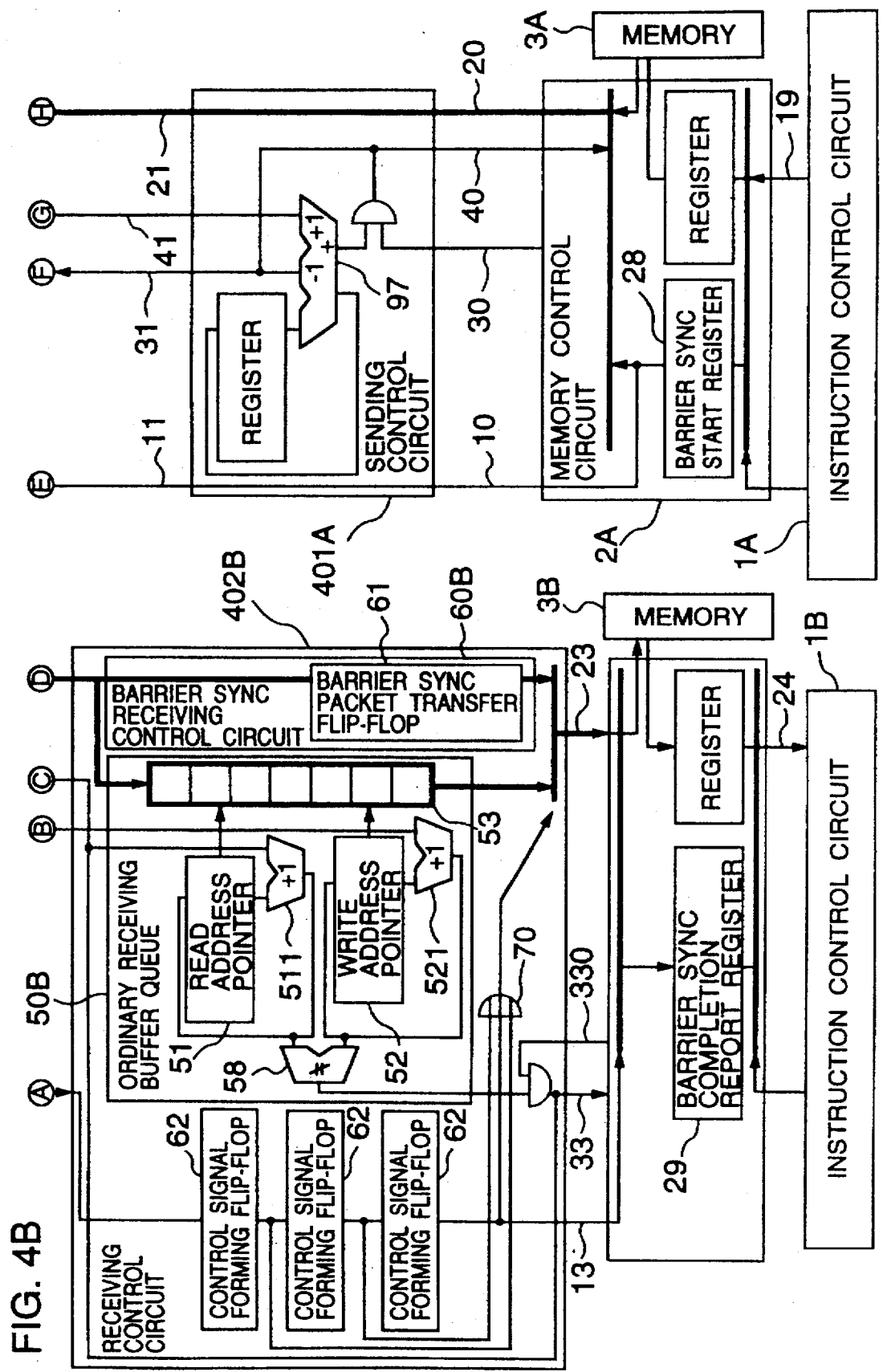
Figure 5:
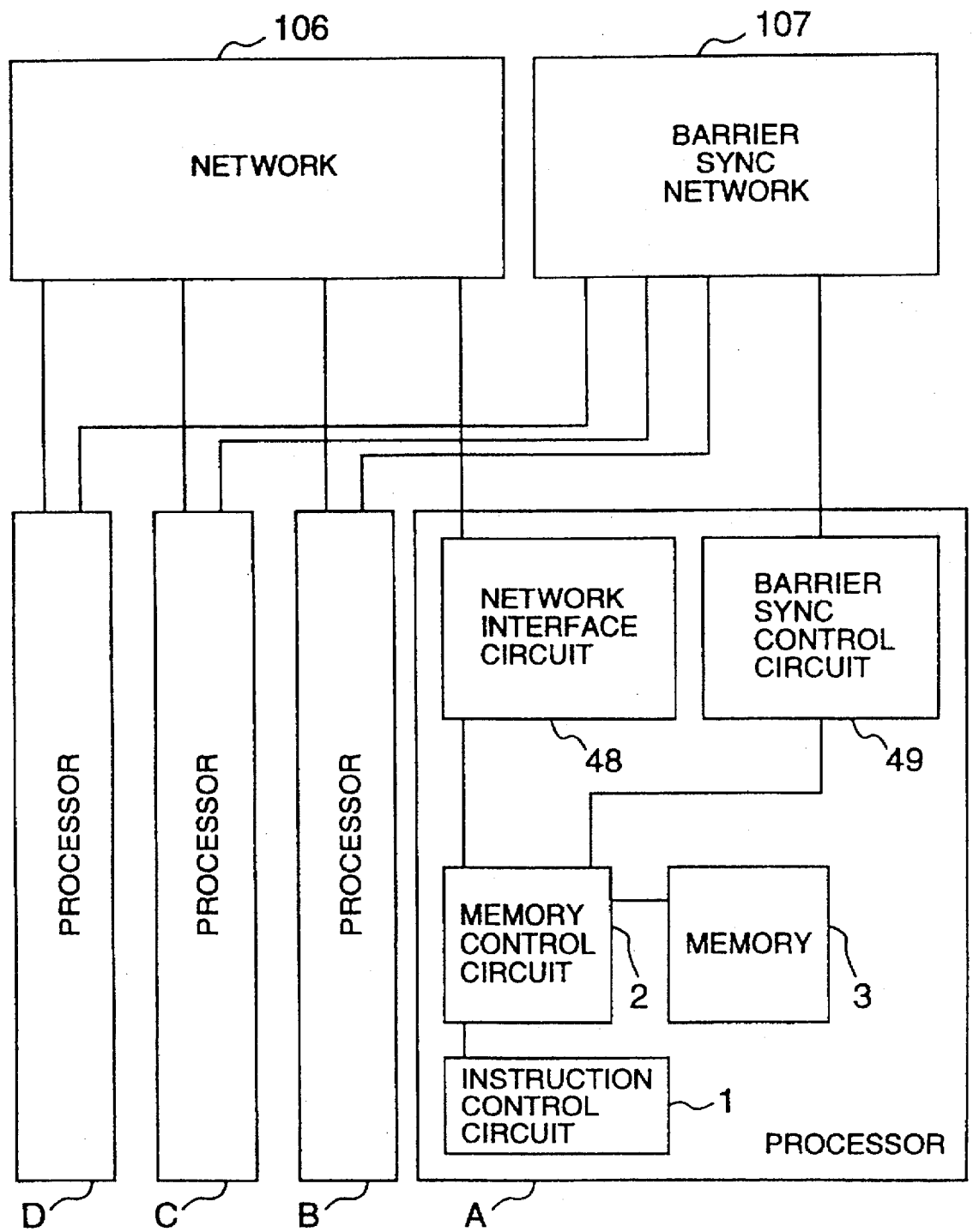
FIG. 5 is a block diagram showing the schematic configuration of a conventional parallel computer system provided with an exclusive network for two, barrier synchronization and general-use SEND, protocols.

FIGS. 4A and 4B show another embodiment in which such a change as mentioned above is made.

A plurality of bits at the head of a packet is designed so that not only can judgment be made as to whether the packet is a barrier synchronization packet or an ordinary packet, but also judgment can be made as to whether the packet is a preferential packet which has higher priority than other packets or not when the packet is not a barrier synchronization packet. An instruction control circuit transfers a buffer ID switching signal together with a preferential packet onto the signal line 10 when the instruction control circuit transfers the preferential packet. This embodiment of FIGS. 4A and 4B is different in configuration from the embodiment of FIGS. 2A and 2B in that the decode circuit (510A, 510B) is capable of further decoding a preferential packet. Therefore, the decode circuit is provided with an additional function of transferring a value "1" to the signal line (506A, 506B) when the decode circuit has decoded a preferential packet. A preferential packet is however sent to the multiplexor 503 through the signal line 504A (or 504B) like an ordinary packet. Further, an OR circuit 507 is provided so as to perform ORing on an output signal of the AND circuit 502 and signals on signal lines 506A and 506B (connection between the signal line 506B and the OR circuit 507 is not shown in the drawing merely for simplification of the drawing). As a result, a preferential packet is transferred together with a buffer ID switching signal to a processor to which the preferential packet is to be sent. Thus, in the same manner as a barrier synchronization packet, a preferential packet is delivered between instruction control circuits by passing through the receiving control circuit and the sending control circuit, with higher priority than an ordinary packet.

Effects obtained by the disclosed typical embodiments of the present invention will be briefly described below.

The sending of a packet head is informed by only one interrupting signal line which is additionally provided as a transmission line while the use of a packet is judged by using a plurality of bits of a packet head sent on an ordinary data transfer line. Accordingly, a barrier synchronization network can be realized by additionally providing only one signal line.

Further, in the priority control circuit in which a barrier synchronization packet is given the highest priority, a barrier synchronization packet is transferred preferentially over an ordinary communication packet so that the speed of the barrier synchronization processing the time for which is determined by the longest processing time among the processors can be made high to thereby shorten the time taken for performing the processing of a user program including barrier synchronization.

Further, a barrier synchronization packet is made to have a fixed length so as to be written in a flip-flop and is made to bypass storage means such as a register file, or the like, which is low in processing speed while it is highly integrated. Accordingly, the transfer time of the network can be further shortened, and, in the buffer therefor, it is possible to reduce its capacity by tens of bits per one receiving circuit.

What is claimed is:

1. A parallel computer system which includes a plurality of processors and a network for transmitting packets between said processors, said network comprising:
   a packet buffer for temporarily storing a packet;
   a path for bypassing said packet buffer;
   a signal line for supplying an interrupting signal associated with a packet; and
   a selector, responsive to the interrupting signal on said signal line, for selectively outputting one of outputs from said packet buffer and;
   wherein each processor sends a preferential packet onto said network and transfers an interrupting signal onto said signal line,
   wherein each of said plurality of processors sends a synchronization report packet as the preferential packet onto said transmission line when said processor advances its processing to a predetermined extent, and said network transfers a synchronization establishment packet and the interrupting signal thus transferred onto said plurality of processors under the condition that said network receives synchronization report packets from said plurality of processors respectively.

2. A parallel computer system according to claim 1, wherein said network includes storage respectively corresponding to said plurality of processors so that said storage stores synchronization report packets respectively from said corresponding processors, and further includes means for generating said synchronization establishment packet when all of said storage have received said synchronization report packets respectively.

3. A parallel computer system according to claim 2, wherein said synchronization establishment packet is broadcast to the processors which have generated the synchronization report packets respectively.

4. A parallel computer system according to claim 1, wherein a preferential packet has a fixed length, and wherein said selector outputs said preferential packet from said bypassing path during transfer of said fixed length in response to an interrupting signal on said signal line.

5. A parallel computer system, comprising:
   a plurality of processors and a network for transmitting a packet from each of said plurality of processors, wherein
   each of said processors includes:
     a sending circuit for transferring a packet to said network, and
     a receiving circuit for receiving a packet from said network;
   said receiving circuit of each of said processors includes:
     a buffer of a plurality of stages for temporarily accumulating said packet,
     a bypassing path for bypassing said buffer, and
     means for making a decision as to which one of said buffer and said bypassing path is to be selected;
   each of said sending and receiving circuits of each of said processors having a signal line for transmitting an interrupting signal associated with a packet;
   said sending circuit includes means for transferring an interrupting signal onto said signal line with respect to a preferential packet to be transmitted with higher priority than other packets; and
   said receiving circuit includes a selector, responsive to an interrupting signal on said signal line, causes output of one of the outputs from said buffer and said bypassing path,
     wherein each of said plurality of processors gives an instruction to the corresponding sending circuit so as to send a synchronization report packet as a preferential packet onto said network when said each of said plurality of processors advances its processing to a predetermined extent, and
     said network transfers a synchronization establishment packet and an interrupting signal onto said plurality of processors and said signal line respectively under a condition that said network receives synchronization report packets from said plurality of processors respectively.

6. A parallel computer system according to claim 5, wherein said network includes storage respectively corresponding to said plurality of processors so that said storage store synchronization report packets respectively from said corresponding processors, and wherein it is decided that said condition is established when all of said storage have received said synchronization report packets respectively.

7. A parallel computer system according to claim 6, wherein said synchronization establishment packet is broadcast to the processors which have generated the synchronization report packets respectively.

8. A parallel computer system according to claim 7, wherein said discriminating means judges whether a preferential packet transferred thereto is a synchronization report packet or any other preferential packet than a synchronization report packet, and when said preferential packet transferred thereto is any other preferential packet than a synchronization report packet, said network transfers, through said signal line, an interrupting signal associated with said packet to the processor to which said packet is to be transferred.

9. A parallel computer system according to claim 6, wherein said network includes discriminating means for discriminating a preferential packet, and when a packet transferred from a processor is a synchronization report packet, said network transfers an interrupting signal onto said signal line under the condition that said network receives synchronization report packets from said plurality of processors respectively.

10. A parallel computer system according to claim 5, wherein a preferential packet has a fixed length, and wherein said selector outputs said preferential packet from said bypassing path during transfer of said fixed length in response to an interrupting signal on said signal line.

11. A parallel computer system comprising a plurality of processors and a network for transmitting a packet from each of said plurality of processors, wherein each of said processors includes a sending circuit for transferring a packet to said network and a receiving circuit for receiving a packet from said network;

said receiving circuit of each of said processors includes:
a buffer of a plurality of stages for temporarily accumulating said packet,
means for sending a packet transfer request to said network if said buffer is not full with packets,
a bypassing path for bypassing said buffer, and
means for making a decision as to which one of said buffer and said bypassing path is to be selected;

said sending circuit of each of said processors includes means for transmitting a packet through said network upon receiving a packet transfer request from the receiving circuit of a packet sending target;

each of said sending and receiving circuits of each of said processors having a signal line for transmitting an interrupting signal associated with a packet;

said sending circuit includes means for transferring an interrupting signal onto said signal line with respect to a preferential packet to be transmitted with higher priority than other packets; and said receiving circuit includes a selector responsive to an interrupting signal on said signal line to output one of the outputs from said buffer and said bypassing path.

12. A method of synchronizing a plurality of processors in a parallel computer system in which said plurality of processors are connected through a network, said method comprising the steps of:

detecting that a process within one of said plurality of processors reaches a predetermined stage;

interrupting transmission of a message packet from said one of plurality of processors when said one of said plurality of processors is sending said message packet;

transmitting a report packet indicating that said one of said plurality of processors reached said predetermined stage to said network;

stopping a process within said one of said plurality of processors after transmitting said report packet to said network;

detecting in said network said report packet from said one of said plurality of processors;

interrupting reception of said message packet in said network when said network is receiving said message packet, and receiving said report packet in said network in preference to reception of said message packet;

transmitting a synchronization establishment packet representing establishment of synchronization from said network; and receiving said synchronization establishment packet in said one of said plurality of processors to re-start the process within said one of said plurality of processors.

13. A method of synchronizing a plurality of processors in a parallel computer system according to claim 12, wherein said step of transmitting said synchronization establishment packet and said step of receiving said synchronization establishment packet includes the following substeps of:

interrupting transmission of another message packet from said network to said one of said plurality of processors when said network is sending said another message packet to said one of said plurality of processors;

transmitting said synchronization establishment packet from said network to said one of said plurality of processors;

detecting said synchronization establishment packet from said network in said one of said plurality of processors;

interrupting reception of another message packet in said one of said plurality of processors when said one of said plurality of processors is receiving said another message packet; and receiving said synchronization establishment packet in said one of said plurality of processors in preference to said another message packet.

\* \* \* \* \*